(12) United States Patent
Kim

(10) Patent No.: US 10,899,216 B2
(45) Date of Patent: Jan. 26, 2021

(54) ACTIVE ENGINE MOUNT FOR VEHICLE

(71) Applicants: Hyundai Motor Company, Seoul (KR); Kia Motors Corporation, Seoul (KR)

(72) Inventor: Seung Won Kim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 180 days.

(21) Appl. No.: 16/159,949

(22) Filed: Oct. 15, 2018

(65) Prior Publication Data
US 2020/0055384 A1 Feb. 20, 2020

(30) Foreign Application Priority Data
Aug. 20, 2018 (KR) .......................... 10-2018-0096546

(51) Int. Cl.
*B60K 5/12* (2006.01)
*H02K 7/18* (2006.01)
*F16F 15/03* (2006.01)

(52) U.S. Cl.
CPC .......... *B60K 5/1283* (2013.01); *B60K 5/1208* (2013.01); *F16F 15/03* (2013.01); *H02K 7/1876* (2013.01); *B60K 5/1291* (2013.01)

(58) Field of Classification Search
CPC .. B60K 5/1283; B60K 5/1208; B60K 5/1291; B60K 5/1233; F16F 15/03; F16F 13/26; F16F 13/30; F16F 13/28; H02K 7/1876

USPC ......................................... 267/140.14, 140.15
See application file for complete search history.

(56) References Cited

U.S. PATENT DOCUMENTS

| 5,228,663 | A | * | 7/1993 | Adler | F16F 1/3615 267/140.14 |
| 5,967,269 | A | * | 10/1999 | Kato | F16F 15/03 188/380 |
| 2013/0001843 | A1 | * | 1/2013 | Kanaya | F16F 13/26 267/140.14 |
| 2017/0291464 | A1 | | 10/2017 | Isaac et al. | |

FOREIGN PATENT DOCUMENTS

| JP | 2002-031186 A | 1/2002 |
| JP | 2004-232708 A | 8/2004 |
| JP | 2005-155900 A | 6/2005 |
| JP | 2008-095930 A | 4/2008 |
| KR | 10-2005-0054170 A | 6/2005 |
| KR | 10-1230554 B1 | 2/2013 |

* cited by examiner

*Primary Examiner* — Melanie Torres Williams
(74) *Attorney, Agent, or Firm* — Morgan, Lewis & Bockius LLP

(57) ABSTRACT

An active engine mount for a vehicle may include a support bracket connected to an engine; an actuator assembly integrally coupled to the support bracket and including a magnet and a coil that electromagnetically interact with each other; and a rubber assembly mounted to a vehicle body by a mounting bracket and configured to absorb vibration via a main rubber, wherein in a state in which the actuator assembly is located above the rubber assembly, a housing of the rubber assembly is fastened to the support bracket, and wherein the magnet is connected to the main rubber of the rubber assembly to enable transfer of force.

16 Claims, 24 Drawing Sheets

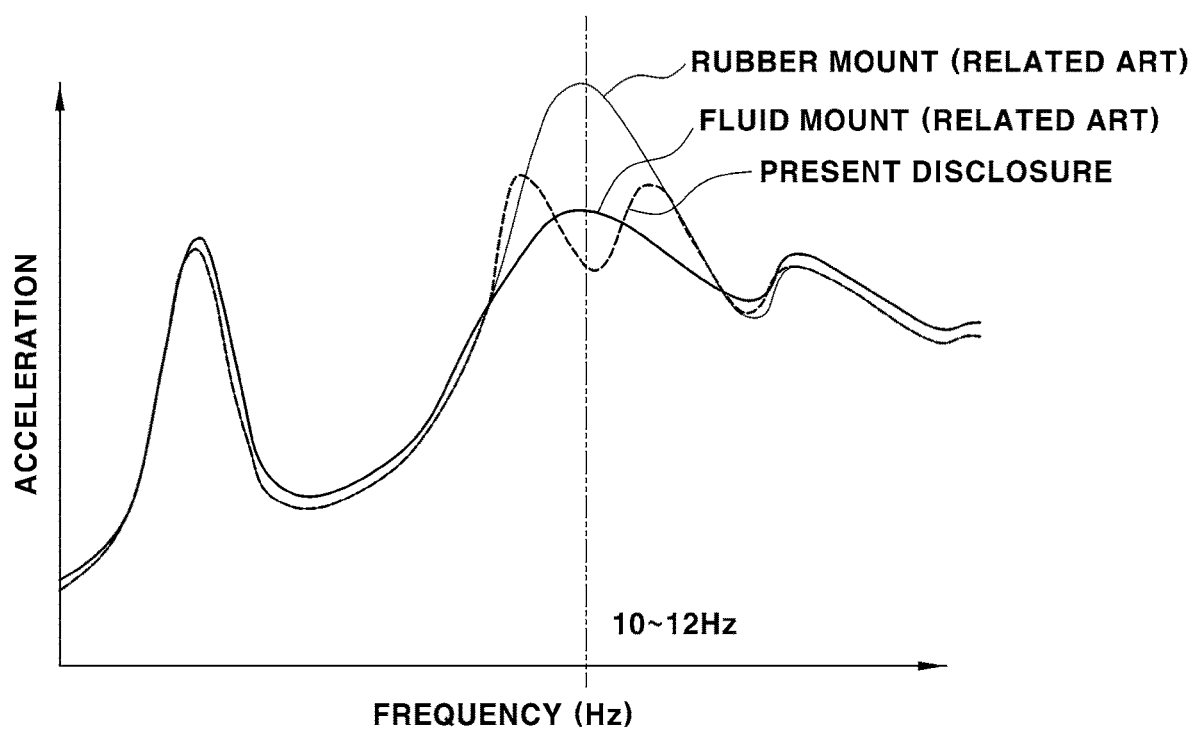

ACTIVE ENGINE MOUNT FOR VEHICLE

CROSS-REFERENCE TO RELATED APPLICATION

The present application claims priority to Korean Patent Application No. 10-2018-0096546 filed on Aug. 20, 2018, the entire contents of which is incorporated herein for all purposes by this reference.

BACKGROUND OF THE INVENTION

Field of the Invention

The present invention relates to an active engine mount for a vehicle, and more particularly, to an active engine mount for a vehicle which enables omission of a fluid system and has a power generation function.

Description of Related Art

In general, when mounting a power train including an engine and a transmission in an engine compartment, an engine mount for vibration control is applied to a position at which the engine is mounted and supported.

Such an engine mount is usually mounted to be located at the upper end portion of a side member of a vehicle body, and a support bracket is connected between the upper surface of the engine mount and the engine to interconnect the engine mount and the engine.

However, since engine combustion sound or the like may often be transferred to a passenger compartment through the support bracket, as illustrated in FIG. 1, a mass damper 22 may be additionally applied to a support bracket 20 coupled to the upper surface of an engine mount 10 for attenuating vibration and noise.

That is, since the support bracket which interconnects the engine mount and the engine tends to have poor dynamic stiffness due to a cantilever structure thereof, to overcome this, the mass damper is additionally applied to the support bracket.

However, when the mass damper (about 2.6 kg) is applied to the support bracket, the weight of a vehicle increases, which is problematic.

Therefore, an inverse-type engine mount may also be applied to overcome the problem described above.

The inverse-type engine mount is an engine mount which is upside down so that an orifice assembly is located at the upper side and a rubber assembly is located at the lower side, and the orifice assembly located at the upper side is connected to the support bracket.

In the present structure, the orifice assembly (flow-path assembly), i.e. a fluid assembly and a bracket portion are connected to the support bracket and also serve as a mass damper of the support bracket.

Furthermore, since rattle noise or the like generated from the orifice assembly (flow-path assembly) is attenuated by a main rubber and is transferred to the vehicle body, the inverse-type engine mount is advantageous in terms of membrane rattle noise and enables a reduction in high-frequency vibration and noise.

However, such a known inverse-type engine mount as well as a conventional engine mount require a fluid system having a complicated configuration, and thus need to overcome the problem of rattle noise generated in the fluid system or the like, and also have poor manufacturing efficiency due to, for example, sealing of the fluid system.

Furthermore, a conventional active mount which is not of an inverse-type requires an actuator including a magnet, a coil, and a core, for example, under an insulator, and thus, is increased in vertical size, i.e. height compared to an existing engine mount, which is disadvantageous for the layout of a package.

In particular, in the case of a front-wheel drive vehicle that adopts a transverse engine mounting method, it is difficult to configure an active actuator, since a lower height of the engine mount is further advantageous from the aspect of noise, vibration, and harshness (NVH).

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an inverse-type active engine mount for a vehicle which enables omission of a fluid system, has a simplified configuration despite the provision of an actuator, and eliminates disadvantages in terms of the size and the packaging thereof.

In an aspect, an active engine mount for a vehicle may include a support bracket connected to an engine, an actuator assembly integrally coupled to the support bracket and including a magnet and a coil that electromagnetically interact with each other, and a rubber assembly mounted to a vehicle body by a mounting bracket and configured to absorb vibration via a main rubber, wherein in a state in which the actuator assembly is located above the rubber assembly, a housing of the rubber assembly is fastened to the support bracket, and wherein the magnet is connected to the main rubber of the rubber assembly to enable transfer of force.

Other aspects and exemplary embodiments of the disclosure are discussed infra.

It is understood that the term "vehicle" or "vehicular" or other similar term as used herein is inclusive of motor vehicles in general such as passenger vehicles including sports utility vehicles (SUV), buses, trucks, various commercial vehicles, watercraft including a variety of boats and ships, aircraft, and the like, and may include hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

The above and other features of the disclosure are discussed infra.

BRIEF DESCRIPTION OF THE DRAWINGS

FIG. 11 is a view illustrating the characteristics of the inverse-type active engine mount according to the exemplary embodiment of the present invention, along with a conventional rubber mount and a conventional fluid mount for comparison.

Figure 1:
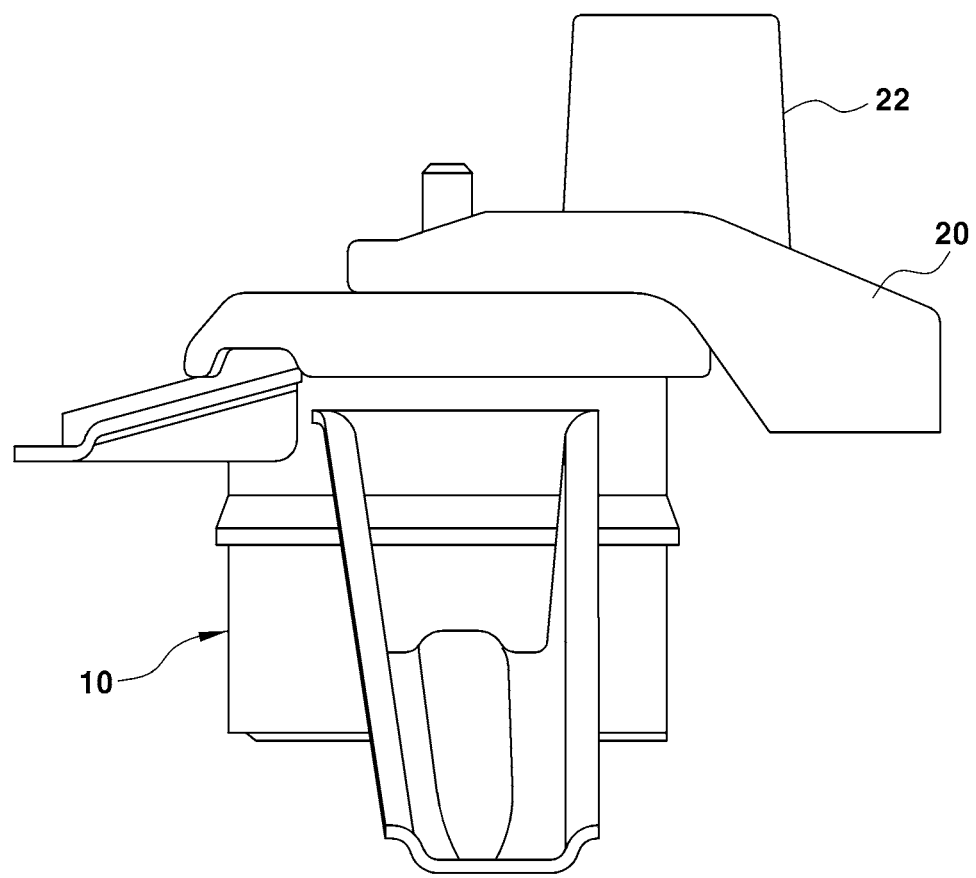
FIG. 1 is a front view illustrating a conventional engine mount.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the other hand, the invention(s) is/are intended to cover not only the exemplary embodiments of the present invention, but also various alternatives, modifications, equivalents and other embodiments, which may be included within the spirit and scope of the invention as defined by the appended claims.

Hereinafter, various exemplary embodiments of the present invention will be described in detail with reference to the accompanying drawings to allow those skilled in the art to easily practice the exemplary embodiments. However, the present invention is not limited to the exemplary embodiments described herein and may be embodied in other forms.

In the entire specification, when an element is referred to as "including" another element, the element should not be understood as excluding other elements so long as there is no special conflicting description, and the element may include at least one other element.

In recent years, there has been growing demand for the application of an active engine mount having an actuator. Moreover, instead of a basic type that requires a separate mass damper, the demand for an inverse-type active engine mount having an inverse-type structure that enables omission of the mass damper is increasing.

Furthermore, with the importance of vehicle fuel economy, there is also increasing demand for in-vehicle devices and elements having a power generation function that are configured for generating electricity.

Accordingly, the present invention includes an improved inverse-type active engine mount which has a simplified configuration despite the provision of an actuator, is configured for overcoming disadvantages in terms of the size and the packaging thereof, and is configured for performing the roles of all of a mass damper, a power generator, and an active mount.

A general inverse-type engine mount is advantageous in that a portion thereof including a fluid system such as a flow-path assembly (or an "orifice assembly") is coupled to a support bracket and is configured as a mass damper and in that the portion thereof coupled to the support bracket (that is configured as a mass damper) has a large mass and good sensitivity. However, resonance may occur in the general inverse-type engine mount due to a low first-order natural frequency, which is a problem that needs to be solved.

To the present end, in the inverse-type active engine mount for a vehicle according to an exemplary embodiment of the present invention, an actuator assembly is applied to the inverse-type structure. The actuator assembly is separated from a rubber system and is coupled to a support bracket, so that the actuator assembly and the support bracket have an integrated structure.

In particular, in the inverse-type active engine mount according to an exemplary embodiment of the present invention, an active actuator (i.e., the actuator assembly which will be described below) is located on the upper portion of the engine mount and is integrally coupled to the support bracket, so that the active actuator is configured as a mass damper of the support bracket.

Hereinafter, the configuration of the inverse-type active engine mount according to an exemplary embodiment of the present invention will be described in detail with reference to the accompanying drawings.

Figure 2A:
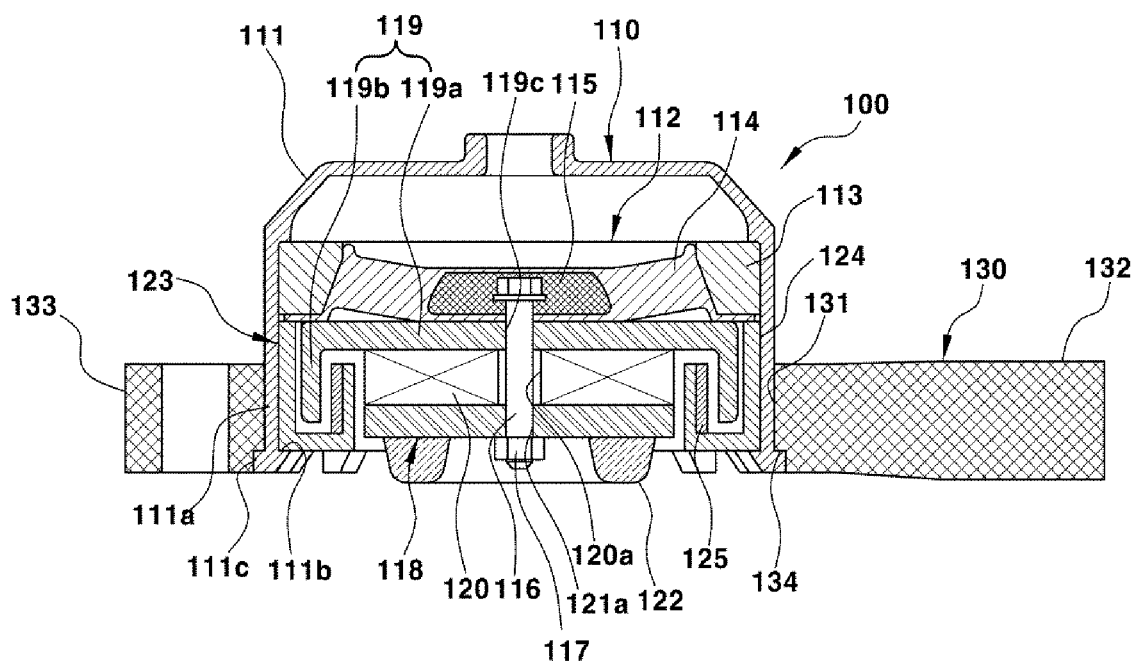
FIG. 2A and FIG. 2B is cross-sectional views illustrating the configuration of an active engine mount for a vehicle according to an exemplary embodiment of the present invention.
Figure 2B:
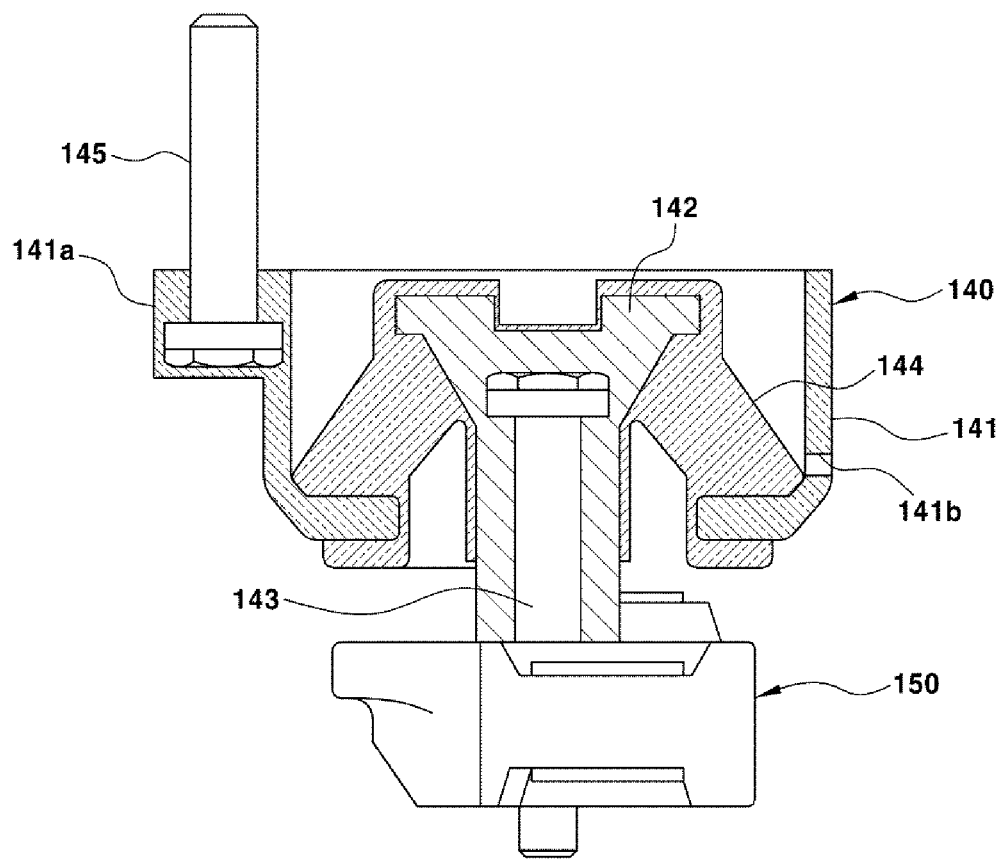
Figure 3A:
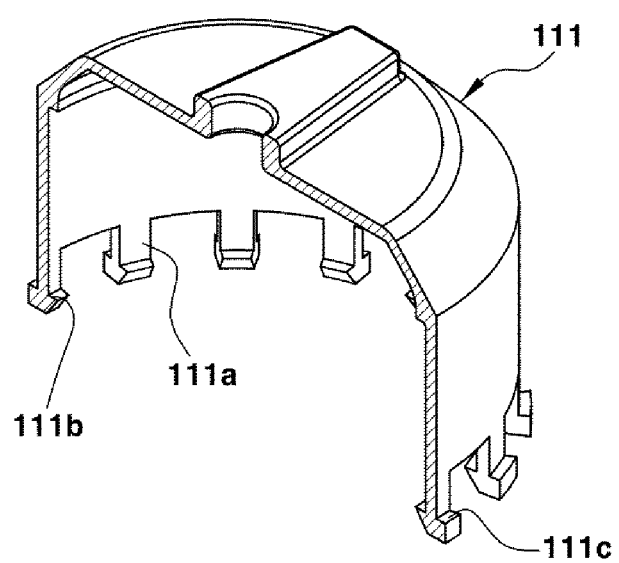
FIG. 3A, FIG. 3B, FIG. 3C, FIG. 3D and FIG. 3E are perspective views illustrating an actuator assembly of the vehicle active engine mount according to the exemplary embodiment of the present invention and an assembly process thereof.
Figure 3B:
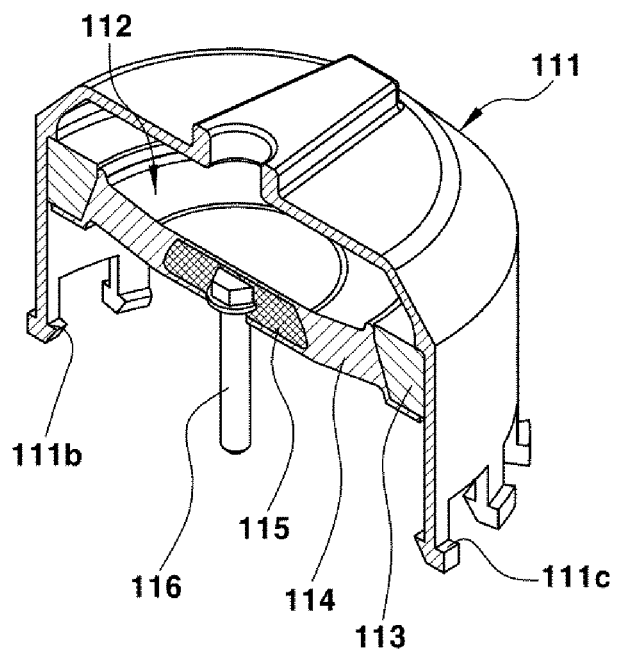
Figure 3C:
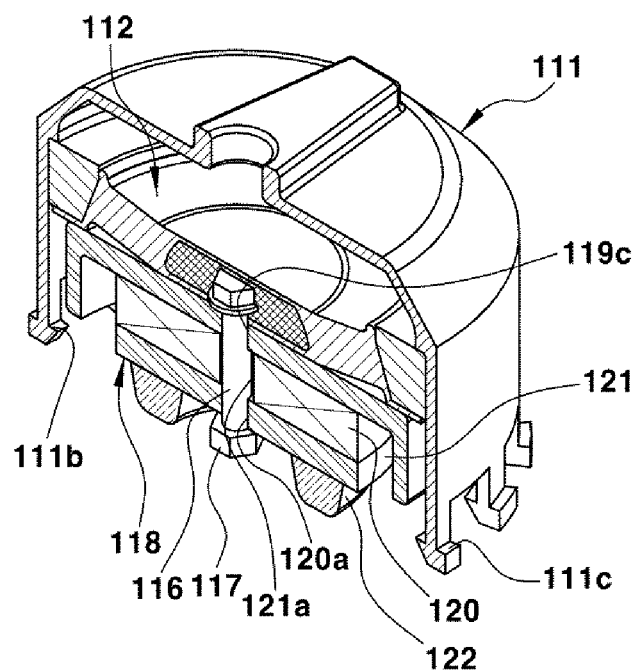
Figure 3D:
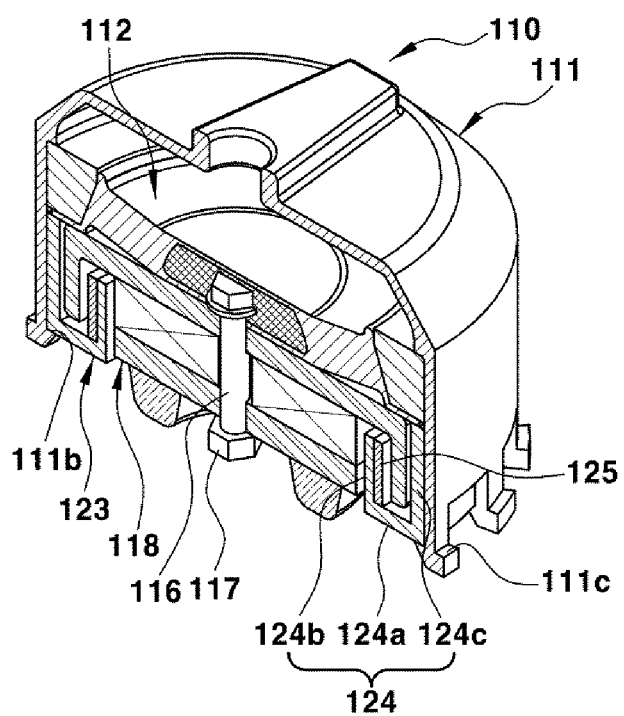
Figure 3E:
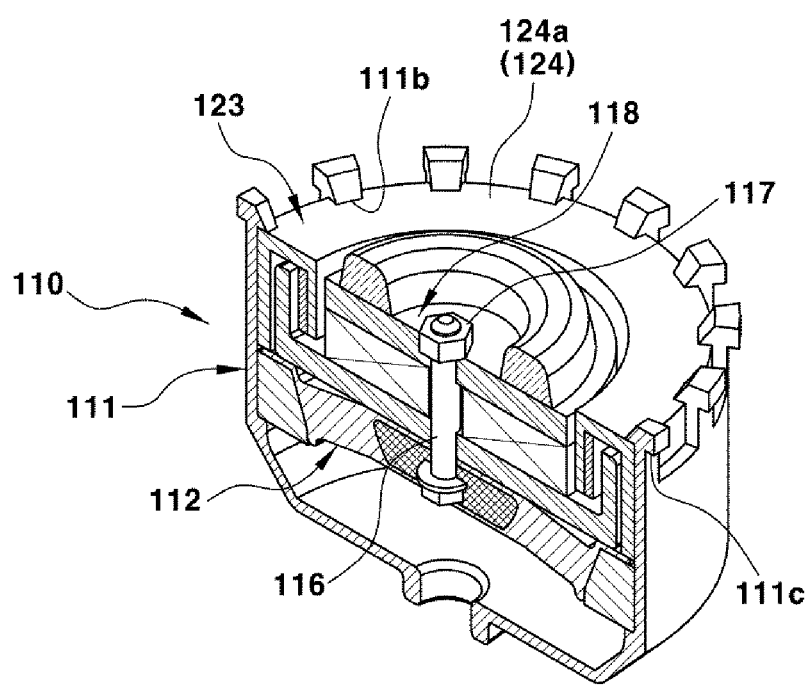
Figure 4A:
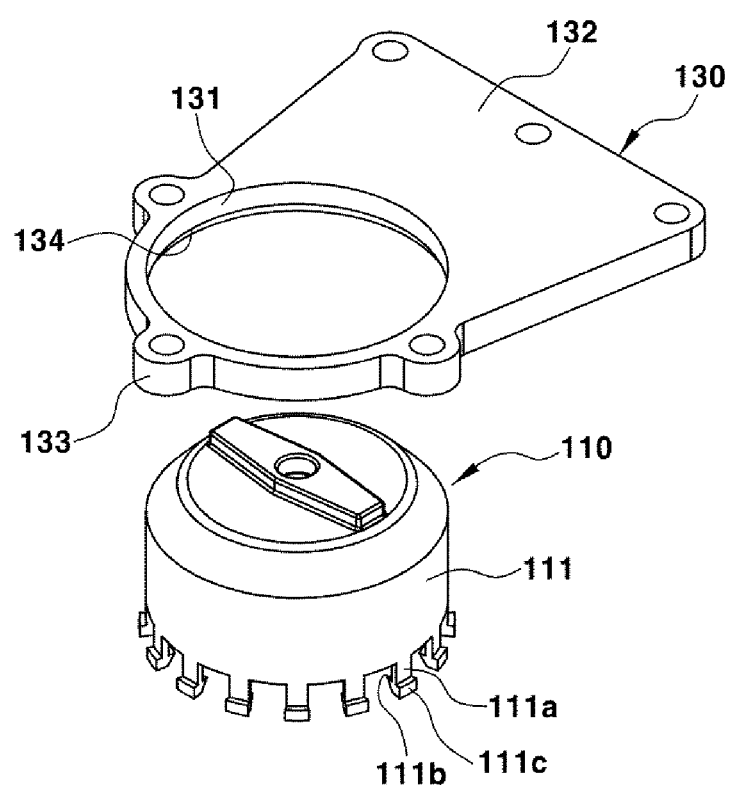
FIG. 4A, FIG. 4B, FIG. 4C, and FIG. 4D are perspective views illustrating a process of mounting a support bracket to the actuator assembly of the vehicle active engine mount according to the exemplary embodiment of the present invention.
Figure 4B:
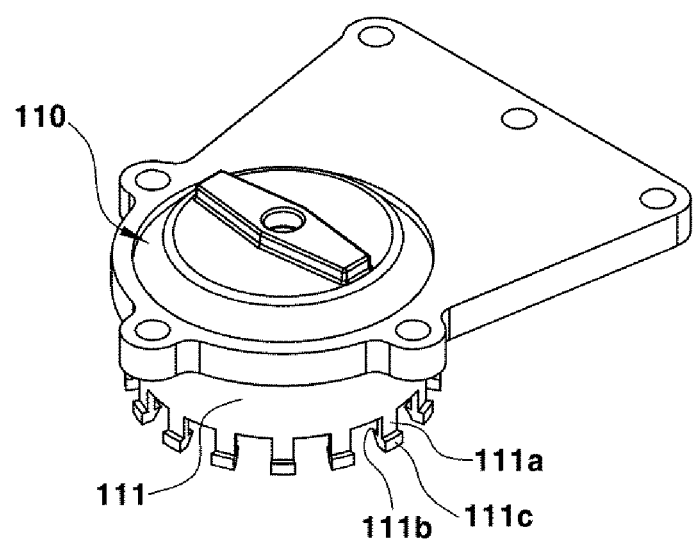
Figure 4C:
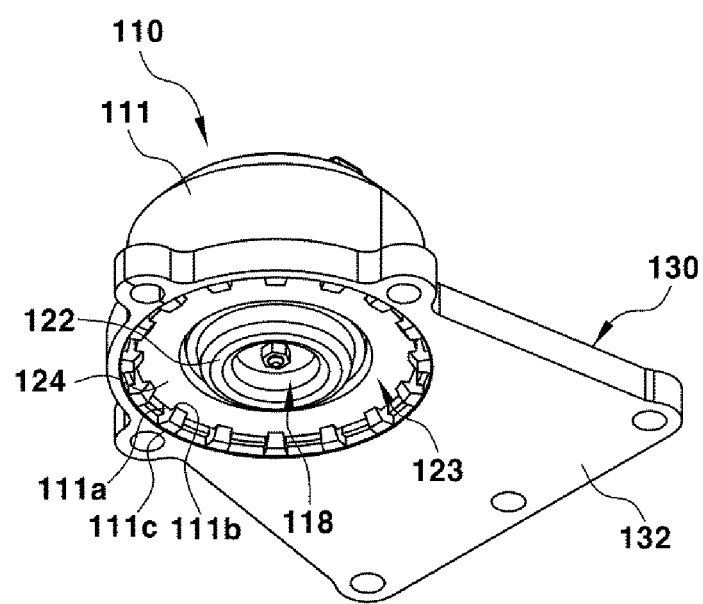
Figure 4D:
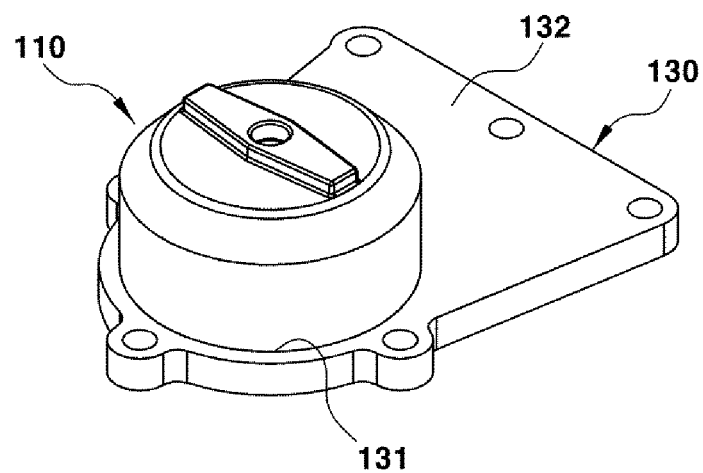
Figure 5A:
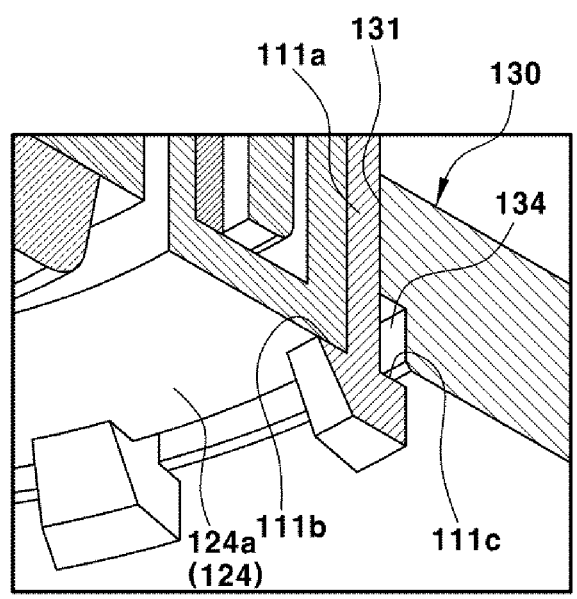
FIG. 5A and FIG. 5B are cross-sectional views of a major portion illustrating the process of mounting the support bracket to the actuator assembly of the vehicle active engine mount according to the exemplary embodiment of the present invention.
Figure 5B:
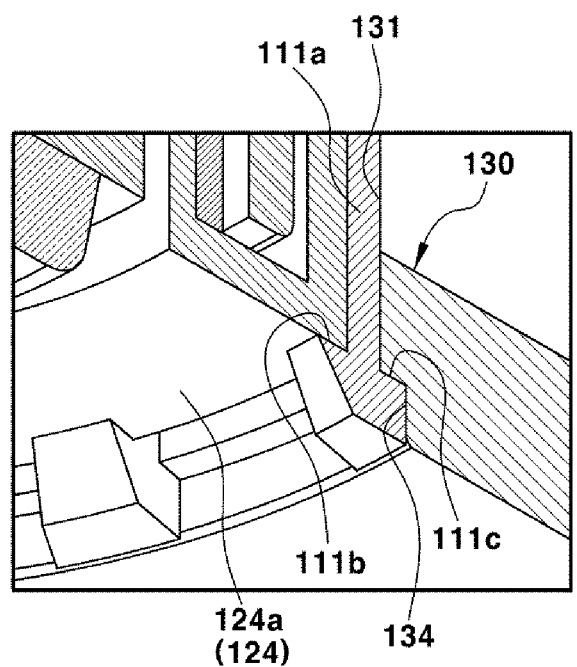

FIG. 2A and FIG. 2B are cross-sectional views illustrating the configuration of the vehicle active engine mount according to an exemplary embodiment of the present invention, and is a cross-sectional view illustrating the state before an actuator assembly 110 and a support bracket 130, which are integrally coupled to each other, are assembled with a rubber assembly 140.

As illustrated, after the actuator assembly 110 and the support bracket 130 are integrally coupled to each other, the rubber assembly 140 is assembled with the support bracket 130.

Referring to FIG. 2A and FIG. 2B, the vehicle active engine mount 100 according to the exemplary embodiment of the present invention includes the support bracket 130 connected to an engine (designated by reference numeral "170" in FIG. 10A, FIG. 10B, and FIG. 10C), the actuator assembly 110 integrally coupled to the support bracket 130, and the rubber assembly 140 mounted on a vehicle body (designated by reference numeral "160" in FIG. 10A, FIG. 10B, and FIG. 10C) to absorb vibration via a main rubber 144.

Here, a housing 141 of the rubber assembly 140 is fastened to the support bracket 130 in the state in which the actuator assembly 110 is located above the rubber assembly 140.

Furthermore, the actuator assembly 110 includes a hook cup 111 inserted into and coupled to a mounting hole 131 formed in the support bracket 130, a coil 125 fixed inside the hook cup 111, and a magnet 120 connected to transfer force to the main rubber 144 of the rubber assembly 140 and provided to electromagnetically interact with the coil 125.

In the present invention, each of the coil 125 and the magnet 120 is provided as an assembly by being assembled with other constituent elements, and form the actuator assembly 110.

FIG. 3A, FIG. 3B, FIG. 3C, FIG. 3D and FIG. 3E illustrate the actuator assembly of the vehicle active engine mount according to the exemplary embodiment of the present invention and an assembly process thereof.

The configuration of the actuator assembly 110 will be described in more detail.

As illustrated in FIG. 3A, FIG. 3B, FIG. 3C, FIG. 3D and FIG. 3E, in the active engine mount 100 according to the exemplary embodiment of the present invention, the actuator assembly 110 includes the hook cup 111, which is to be integrally coupled to the support bracket 130, a magnet-fixing insulator 112, which is provided inside the hook cup 111, a magnet assembly 118, which is laminated on and coupled to the magnet-fixing insulator 112, and a coil assembly 123, which is coupled to the magnet assembly 118 and includes the coil 125 which electromagnetically interacts with the magnet 120 of the magnet assembly 118.

In the actuator assembly 110, the hook cup 111 is integrally coupled to the support bracket 130, and remains in the state of being assembled with the rubber assembly 140, which will be described below, with the support bracket 130 interposed therebetween. The hook cup 111 has an open-bottomed shape.

Furthermore, the hook cup 111 is integrally formed on the lower end portion thereof with a plurality of internal hooks 111b that protrude inwards and a plurality of external hooks 111c that protrude outwards.

More specifically, a plurality of support columns 111a is formed on the lower end portion of the hook cup 111 to extend a long length downwards individually, and is disposed at a predetermined interval (e.g., a constant interval) in the circumferential direction thereof.

Here, the internal hooks 111b and the external hooks 111c share the respective support columns 111a, and protrude from the internal surface and the external surface of the lower end portion of the respective support columns 111a.

The hook cup 111 described above may be manufactured by injection-molding a plastic material. The constituent elements of the actuator assembly 110 are assembled inside the hook cup 111.

That is, first, the magnet-fixing insulator 112 is fixedly provided in the upper region of the internal space of the hook cup 111.

The magnet-fixing insulator 112 is configured to support the magnet assembly 118 including the magnet 120 to be vertically movable in the hook cup 111 and to fix the magnet assembly 118 at a stationary position.

The magnet-fixing insulator 112 described above includes a ring-shaped core, i.e. a ring core 113 having an external surface fixedly coupled in close contact with the internal surface of the hook cup 111, an insulator member 114 integrally coupled to the internal surface of the ring core 113, a support core 115 integrally fixed in the center of the insulator member 114, and a bolt 116 having one end portion integrally fixed and coupled to the support core 115.

The insulator member 114 may be manufactured to have a substantially circular disc shape having a predetermined thickness, and may be manufactured by molding a rubber material.

The insulator member 114 is manufactured by molding such that the insulator member 114 is integrally molded with the ring core 113 to be fixed to the internal surface of the ring core 113 and such that the support core 115 is inserted into the center of the insulator member 114.

The insulator member 114 described above is fixedly provided inside the hook cup 111 so that the bolt 116, fixed thereto via the support core 115, is elongated downwards.

Furthermore, the magnet assembly 118 is laminated underneath the lower surface of the magnet-fixing insulator 112, and is fixed thereto by the bolt 116 and a nut 117.

Here, the bolt 116 is assembled to penetrate the magnet assembly 118, and the nut 117 is fastened to the end portion of the bolt 116, so that the magnet-fixing insulator 112 and the magnet assembly 118 are fixed to each other by the bolt 116 and the nut 117.

The magnet assembly 118 includes an upper core 119, which includes an upper surface portion 119a and a side surface portion 119b and has an open-bottomed circular container shape, the magnet 120 laminated on the lower surface of the upper surface portion 119a of the upper core 119, a lower core 121 laminated on the lower surface of the magnet 120, and a stopper 122, which is formed to have an annular shape and is integrally fixed to the lower surface of the lower core 121.

The upper core 119 has a structure in which the side surface portion 119b is integrally formed along the peripheral edge portion of the circular upper surface portion 119a having a circular shape, to extend downwards.

Furthermore, the magnet 120 has a circular disc shape having a predetermined thickness, and the lower core 121 also has a circular disc shape having a predetermined thickness. Accordingly, the magnet 120 and the lower core 121 are sequentially laminated on the lower surface of the upper surface portion 119a of the upper core 119 and are integrally assembled with each other.

To couple the upper core 119, the magnet 120, and the lower core 121 to each other, bolt holes 119c, 120a and 121a are formed respectively in the centers of the upper surface portion 119a of the upper core 119, the magnet 120, and the lower core 121 so that the bolt 116 of the magnet-fixing insulator 112 may be inserted through the bolt holes 119c, 120a and 121a.

As such, the upper core 119 and the lower core 121 may be steel core formed of a steel material, and the stopper 122 formed of a rubber material may be integrally formed on the lower surface of the lower core 121.

The magnet assembly 118 is laminated and coupled to the underside of the magnet-fixing insulator 112. Here, the upper surface portion 119a of the upper core 119 is laminated in close contact with the insulator member 114 of the magnet-fixing insulator 112.

Furthermore, the bolt 116, which is fixed to the insulator member 114 via the support core 115 inside the hook cup 111, is assembled to sequentially pass through the bolt holes 119c, 120a and 121a in the upper core 119, the magnet 120, and the lower core 121.

Furthermore, the nut 117 is fastened to the end portion of the bolt 116, which has passed through the bolt holes 119c, 120a and 121a in the upper core 119, the magnet 120, and the lower core 121, so that the magnet assembly 118 is completely integrated with and coupled to the magnet-fixing insulator 112.

As such, in the state in which the magnet-fixing insulator 112 and the magnet assembly 118 are coupled to each other by the bolt 116 and the nut 117 as described above, the coil assembly 123 is assembled along the outer-diameter portion of the magnet assembly 118 inside the hook cup 111.

At the instant time, the magnet 120 and the lower core 121 are located inside the side surface portion 119b of the upper core 119, and the coil 125 of the coil assembly 123 is disposed in the circumferential direction around the magnet 120.

Furthermore, the coil 125 is spaced from the magnet 120 with a predetermined distance.

Through the present arrangement, the entire coil assembly 123 has an annular shape, and includes a support frame 124 having a annular shape and the coil 125 disposed on the support frame 124 in the circumferential direction thereof.

The support frame 124 is shaped such that an internal wall 124b and an external wall 124c protrude upwards from the internal-diameter portion and the outer-diameter portion of a lower surface portion 124a having an annular shape. Here, the internal wall 124b and the external wall 124c are in parallel to each other and are continuously formed on the lower surface portion 124a in the circumferential direction thereof.

Furthermore, the coil 125 may be provided in the internal space of the support frame 124, i.e., the space between the internal wall 124b and the external wall 124c. Here, the coil 125 may be fixed to the internal wall surface of the internal wall 124b.

The coil assembly 123 having the above-described configuration is assembled along the outer-diameter portion of the magnet assembly 118 inside the hook cup 111. The coil assembly 123 is inserted into the hook cup 111 such that the external wall surface (i.e., the external peripheral surface) of the external wall 124c is brought into close contact with the internal surface (i.e., the internal peripheral surface) of the hook cup 111.

Furthermore, the coil assembly 123 is assembled with the magnet assembly 118 such that the side surface portion 119b of the upper core 119 is introduced between the internal wall 124b and the external wall 124c of the support frame 124 and such that the internal wall 124b is located in the space between the side surface portion 119b of the upper core 119, the magnet 120, and the lower core 121 of the magnet assembly 118.

That is, in the magnet assembly 118, the magnet 120 and the lower core 121 are located with a predetermined space therebetween inside the side surface portion 119b of the upper core 119. The internal wall 124b of the support frame 124 and the coil 125 are introduced into the predetermined space between the side surface portion 119b of the upper core 119, the magnet 120, and the lower core 121.

Accordingly, in the coil assembly 123, the internal wall 124b of the support frame 124 and the coil 125 mounted on the internal wall 124b are circularly disposed along the space outside the magnet 120 and the lower core 121 of the magnet assembly 118 in the radial direction thereof, i.e., the space outside the periphery of the magnet 120 and the lower core 121.

Here, the coil 125 and the internal wall 124b of the support frame 124 are spaced from the magnet 120 and the lower core 121 with a predetermined distance.

Furthermore, the coil assembly 123 remains in the state of being assembled with the hook cup 111 while being caught and supported by the internal hooks 111b inside the hook cup 111. In the state in which the upper end portion of the external wall 124c of the support frame 124 is in contact with the lower surface of the magnet-fixing insulator 112, the lower end portion of the external wall 124c of the support frame 124 and the lower surface portion 124a are supported in the state of being placed on the internal hooks 111b of the hook cup 111.

That is, once the coil assembly 123 has been inserted into the hook cup 111, the support frame 124 located above the internal hooks 111b is caught by the internal hooks 111b so as not to be separated downwards. Accordingly, the coil assembly 123 remains in the assembled state inside the hook cup 111.

Referring to the last drawing among the drawings in the direction indicated by the arrows in FIG. 3A, FIG. 3B, FIG. 3C, FIG. 3D and FIG. 3E, it may be seen that the support frame 124 of the coil assembly 123, more specifically, the lower surface portion 124a of the support frame 124 is hooked by the internal hooks 111b of the hook cup 111.

When the support frame 124 is hooked and caught by the internal hooks 111b so that the entire coil assembly 123 including the support frame 124 is not separated from the hook cup 111, not only the coil assembly 123 but also the magnet assembly 118 and the magnet-fixing insulator 112, which are integrally assembled to the coil assembly 123 by the bolt 116 and the nut 117, are prevented from being separated from the internal to the hook cup 111.

That is, since the support frame 124 of the coil assembly 123 is caught by the internal hooks 111b of the hook cup 111, the coil assembly 123 including the support frame 124 supports all of the magnet assembly 118 and the magnet-fixing insulator 112 so as not to be separated from the hook cup 111 in the state of being assembled therewith.

By causing the support frame 124, which may be manufactured using a hard metal or the like, of the coil assembly 123 to be locked by the internal hooks 111b of the hook cup 111, strong locking between constituent elements such as the hook cup 111, the magnet-fixing insulator 112, the magnet assembly 118, and the coil assembly 123 may be achieved.

Meanwhile, the support bracket 130 is assembled with the actuator assembly 110, which is assembled as described above, for connection with an engine.

Figure 6:
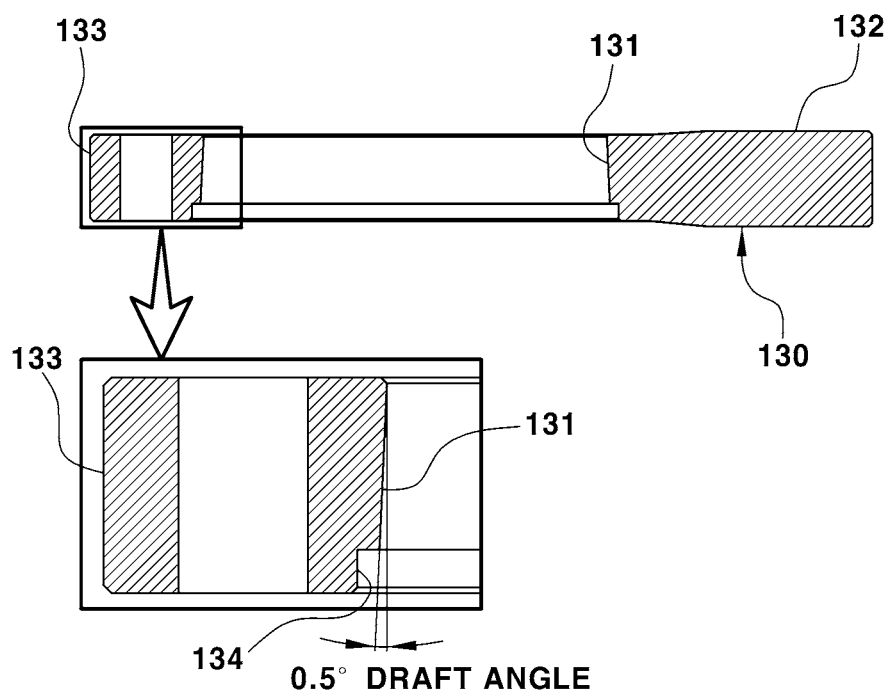
FIG. 6 is a cross-sectional view illustrating the support bracket of the vehicle active engine mount according to the exemplary embodiment of the present invention.

FIG. 4A, FIG. 4B, FIG. 4C, and FIG. 4D, and FIG. 5A and FIG. 5B are perspective views illustrating a process of mounting the support bracket 130 to the actuator assembly 110 of the vehicle active engine mount according to the exemplary embodiment of the present invention and a cross-sectional view of a major portion thereof, and FIG. 6 is a cross-sectional view illustrating the support bracket 130 of the vehicle active engine mount 100 according to the exemplary embodiment of the present invention.

Referring to FIG. 4A, FIG. 4B, FIG. 4C, and FIG. 4D, FIG. 5A and FIG. 5B, and FIG. 6, the support bracket 130 has a structure in which the mounting hole 131 is formed in one side thereof, the other side of which forms an engine mounting plate 132 to be connected to an engine, and a plurality of fastening bosses 133 protrudes from the peripheral portion of the mounting hole 131 for fastening with the rubber assembly 140.

As may be seen clearly in FIG. 6, the mounting hole 131 in the support bracket 130 is formed to have a draft angle (about 0.5°) from the top side to the bottom side thereof.

Due to the draft angle, the mounting hole in the support bracket 130 is formed as a tapered hole that gradually decreases in diameter with decreasing distance to the top side thereof.

Furthermore, a locking groove 134 is formed in the lower end portion of the internal-diameter portion of the mounting hole 131 in the support bracket 130 to have a cross section which is perpendicular to the outside.

The actuator assembly 110 assembled as described above is inserted into and mounted in the mounting hole 131 in the support bracket 130 provided as described above.

More specifically, as illustrated in FIG. 4A, FIG. 4B, FIG. 4C, and FIG. 4D and FIG. 5A and FIG. 5B, the actuator assembly 110 is inserted and fastened upwards through a lower inlet of the mounting hole 131 in the support bracket 130 until the external hooks 111c formed on the lower end portion of the hook cup 111 are completely fitted into and are brought into close contact with the locking groove 134 formed in the lower end portion of the internal-diameter portion of the mounting hole 131 in the support bracket 130, whereby the actuator assembly 110 and the support bracket 130 are assembled with each other.

When the actuator assembly 110 is inserted into the mounting hole 131 in the support bracket 130, the external hooks 111c are fitted into and coupled into the locking groove 134 in the support bracket 130, and at the same time, the hook cup 111 is stopped at the correct assembly position inside the mounting hole 131 in the support bracket 130 by the external hooks 111c to maintain the state in which the actuator assembly 110 and the support bracket 130 are coupled. Accordingly, the hook cup 111 may remain in the locked state inside the support bracket 130.

In particular, due to the draft angle structure, when the actuator assembly 110 is inserted to a certain extent into the mounting hole 131 in the support bracket 130, the hook cup 111 of the actuator assembly 110 is naturally press-fitted into the mounting hole 131 in the support bracket 130. At the instant time, since the external hooks 111c of the hook cup 111 are fitted into the locking groove 134 formed inside the mounting hole 131 in the support bracket 130, the locked state of the support bracket 130 and the hook cup 111 may be maintained.

In the present way, the hook cup 111 may be press-fitted into the mounting hole 131 in the support bracket 130, and the internal hooks 111b of the hook cup 111 may securely hook the actuator assembly 110 when the external hooks 111c of the hook cup 111 are coupled into the locking groove 134.

Next, the actuator assembly 110 and the support bracket 130, which are assembled with each other as described above, are also assembled with the rubber assembly 140.

Figure 7A:
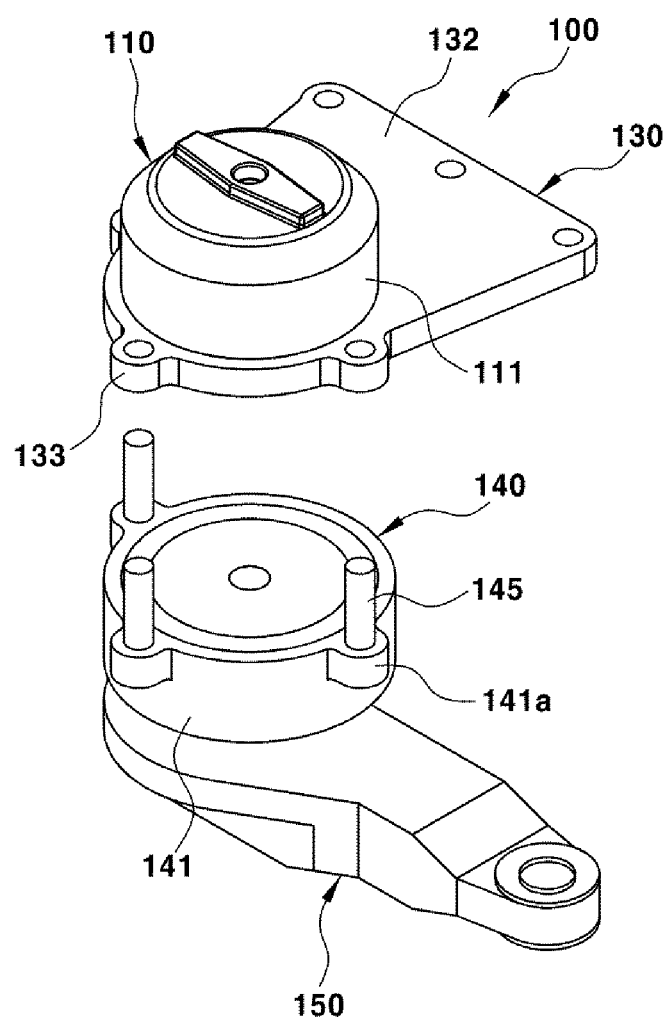
FIG. 7A, FIG. 7B and FIG. 7C are perspective views illustrating a process of assembling the actuator assembly and the support bracket of the vehicle active engine mount according to the exemplary embodiment of the present invention with a rubber assembly.
Figure 7B:
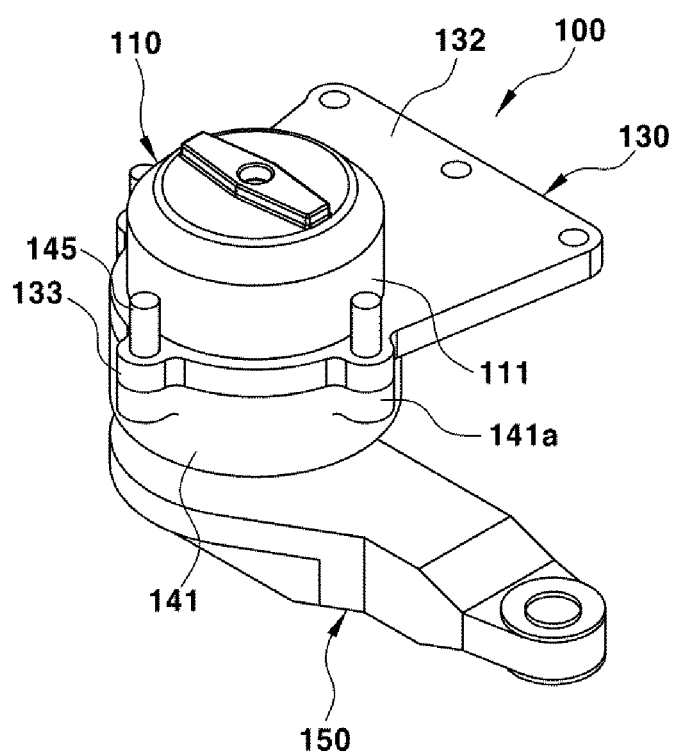
Figure 7C:
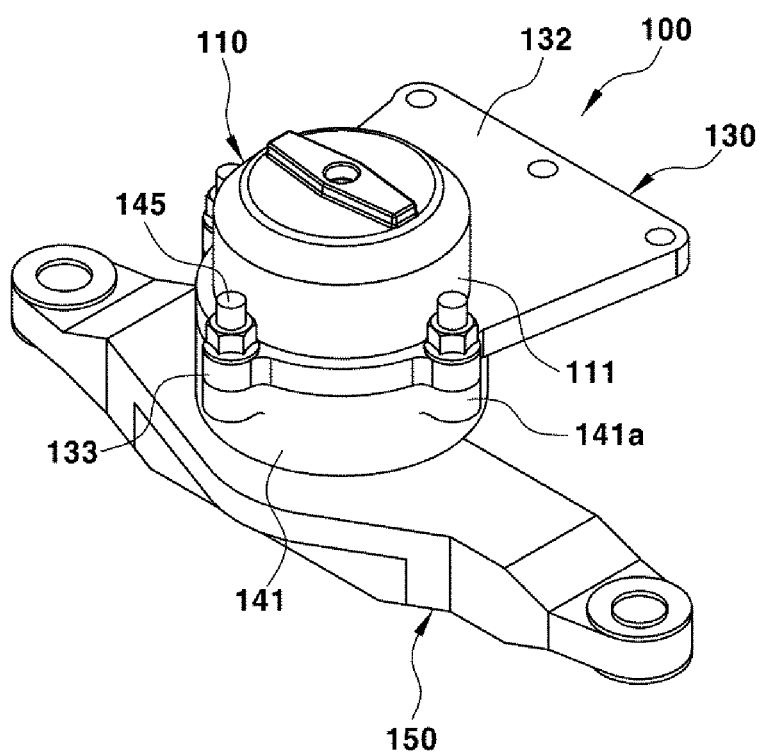

FIG. 7A, FIG. 7B and FIG. 7C are perspective views illustrating a process of assembling the actuator assembly 110 and the support bracket 130 of the vehicle active engine mount 100 according to the exemplary embodiment of the present invention with the rubber assembly 140.

The rubber assembly 140 includes the housing 141 having an open-topped shape, a metallic internal core 142 having a core bolt 143 disposed inside the housing 141, and the main rubber 144 formed by curing molding to be integrally coupled to and surround the internal core 142 and to be integrally coupled to the bottom surface of the housing 141.

The internal core 142 is configured as the framework of the main rubber 144 in the state in which at least a portion thereof is located inside the main rubber 144, and the core bolt 143 is integrally mounted inside the internal core 142 when the internal core 142 is manufactured.

Here, the core bolt 143 protrudes outwards from the housing 141 through a hole formed in the bottom surface of the housing 141. As illustrated in FIG. 2A and FIG. 2B, the core bolt 143, which protrudes downwards out of the housing 141, is bolted to a mounting bracket 150 to be coupled to a vehicle body.

The mounting bracket 150 is a mounting support bracket which is coupled to the vehicle body to support the engine mount 100 including the rubber assembly 140 from the lower side thereof.

The main rubber 144 performs control to absorb and remove three-directional vibrations in the X, Y, and Z directions, such as vehicle driving vibrations and vibrations input from an engine, while being integrally coupled to the internal core 142 and the housing 141.

Furthermore, a plurality of mounting bosses 141a integrally protrudes from the outer-diameter surface of the housing 141 to be coupled to the fastening bosses 133 of the support bracket 130 via bolts 145.

The actuator assembly 110 and the support bracket 130, which are assembled as described above, are assembled with the rubber assembly 140 provided as described above.

To the present end, as illustrated in FIGS. 2 and 6, in the state in which the actuator assembly 110 is inserted into and mounted inside the mounting hole 131 in the support bracket 130, the actuator assembly 110 is located above the rubber assembly 140 and the mounting bosses 141a formed on the housing 141 of the rubber assembly 140 are brought into close contact with and are bonded to the fastening bosses 133 of the support bracket 130 to be aligned therewith. As such, the bolts 145 are inserted through the mounting bosses 141a and the fastening bosses 133 and nuts 146 are fastened to the bolts 145, so that the actuator assembly 110 and the support bracket 130 may be integrally coupled to and assembled with the rubber assembly 140.

FIG. 2A and FIG. 2B is a cross-sectional view illustrating the state before the rubber assembly 140 is assembled in the state in which the actuator assembly 110 and the support bracket 130 are integrally coupled to each other, and illustrates the actuator assembly 110 and the support bracket 130 in the state of being separated from the rubber assembly 140.

In FIG. 2A and FIG. 2B, reference numeral "141b" designates a drain hole through which water is discharged outwards from the internal to the housing 141 to prevent water from being gathered in the housing 141 of the rubber assembly 140. The drain hole 141b may be formed in the lower portion of the housing 141.

Figure 8:
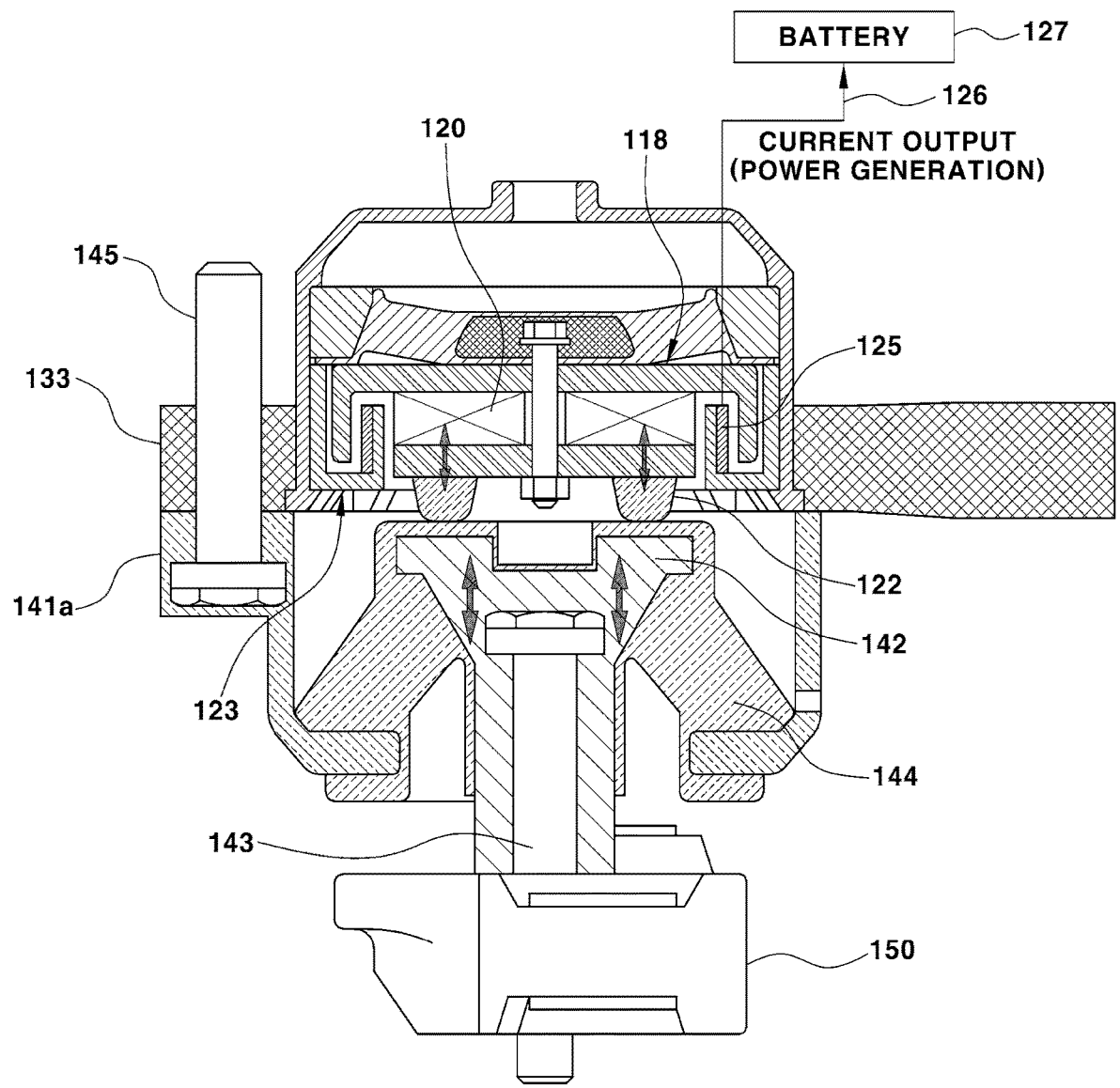
FIG. 8 and FIG. 9 are cross-sectional views illustrating the assembled state and the operational state of the vehicle active engine mount according to the exemplary embodiment of the present invention.
Figure 9:
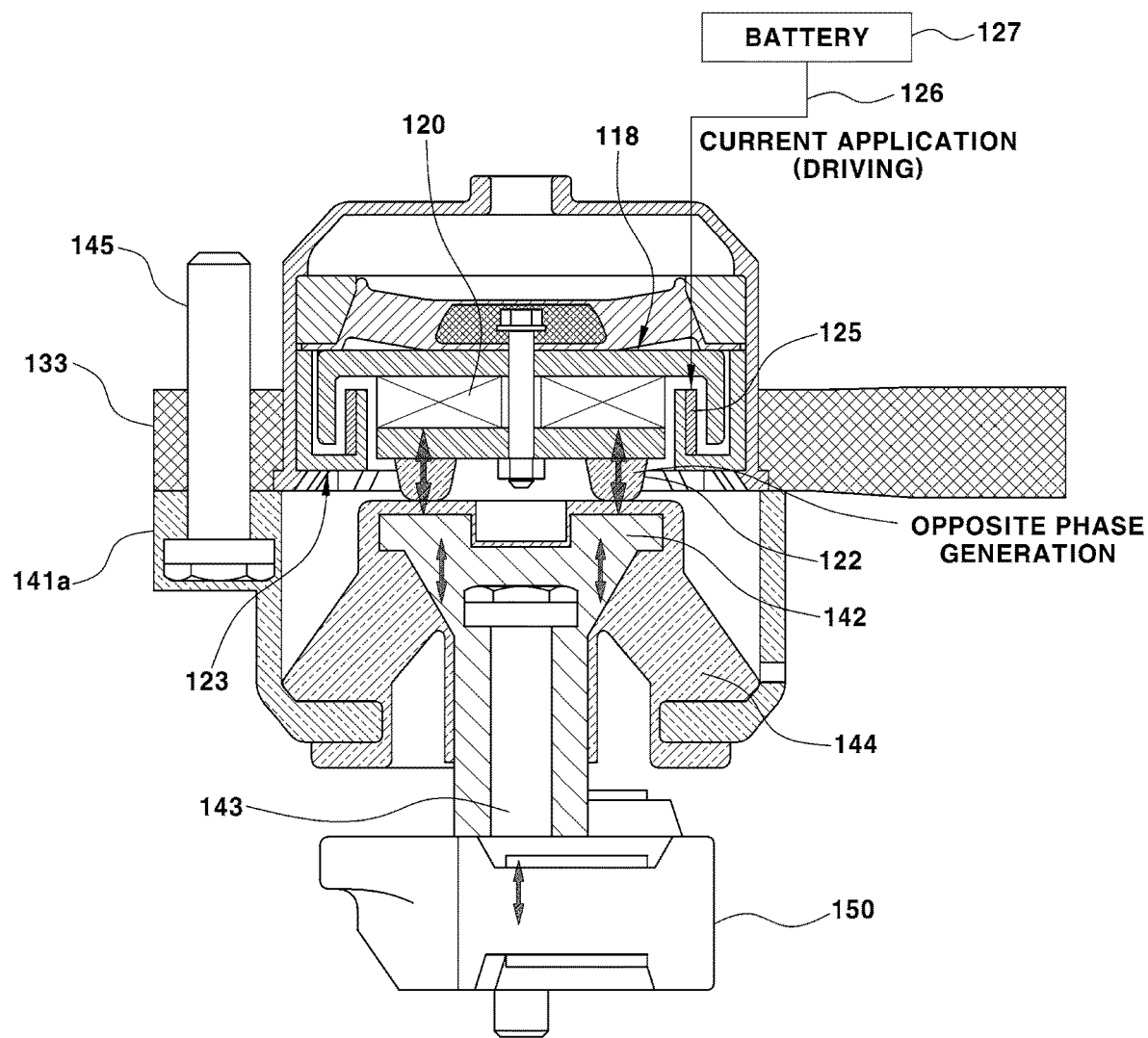

FIG. 8 and FIG. 9 are cross-sectional views illustrating the assembled state and the operational state of the vehicle active engine mount 100 according to the exemplary embodiment of the present invention.

FIG. 8 is a view illustrating the state in which the active engine mount 100 is undergoing a power generation operation, and FIG. 9 is a view illustrating the state in which the active engine mount 100 is operating to control vibrations.

Referring to FIGS. 2, 8 and 9, in the state in which the actuator assembly 110 is integrally coupled to the support bracket 130, the rubber assembly 140 is disposed to be located thereunder. Thereafter, by fastening the housing 141 of the rubber assembly 140 to the support bracket 130 thereabove using the bolts 145 and the nuts 146, all of the actuator assembly 110, the support bracket 130, and the rubber assembly 140 may be integrally coupled.

In the configuration of the actuator assembly 110, the stopper 122 formed of a rubber material is integrally molded in an annular shape and fixed to the lower surface of the lower core 121 of the magnet assembly 118. The stopper 122 is laminated on the main rubber 144, which is located inside the housing 141 of the rubber assembly 140.

The stopper 122 is configured to transfer force between the actuator assembly 110 and the rubber assembly 140 in the state of being in contact with the main rubber 144 thereunder.

In the state in which the active engine mount 100 in an exemplary embodiment of the present invention is provided between the vehicle body and the engine, the main rubber 144 of the rubber assembly 140 (which exhibits 3-directional rubber characteristics) performs control to absorb and remove 3-directional vibrations in the X, Y, and Z directions, such as vehicle driving vibrations and vibrations input from the engine.

Furthermore, in the active engine mount 100 according to an exemplary embodiment of the present invention, the actuator assembly 110 integrally coupled to the upper side of the support bracket 130 has a weight of a predetermined level or higher, and therefore, is configured as a mass damper which is integrated with the support bracket 130 owing to the weight (mass) thereof.

That is, in the active engine mount 100 according to an exemplary embodiment of the present invention, the actuator assembly 110 located at the upper side acts as a weight for the support bracket 130, and therefore, is configured as a mass damper of the support bracket 130.

Furthermore, in the actuator assembly 110, the characteristics of the insulator member 114 included in the magnet-fixing insulator 112 may be set based on a bounce mode. Moreover, the characteristics of rubber elements in the engine mount 100, such as the main rubber 144 of the rubber assembly 140 and the rubber stopper 122 included in the magnet assembly 118 of the actuator assembly 110, may be adjusted.

Here, when elements, such as the internal core 142 and the main rubber 144 of the rubber assembly 140, vibrate in a frequency band which is set in a driving vibration mode (i.e. bounce mode) and move vertically, for example, the magnet 120 of the magnet assembly 118 moves vertically upon receiving force transferred to the actuator assembly 110 through the stopper 122 (see FIG. 8).

When the magnet 120 of the magnet assembly 118 repeatedly moves vertically as described above, electricity is generated via interaction between the magnet 120 and the coil 125. At the instant time, as illustrated in FIG. 8, power generation is performed so that current is output to the outside through the coil 125.

At the instant time, while the magnet 120 and the cores of the magnet assembly 118 (designated by reference numerals "119" and "121" in FIG. 2A and FIG. 2B) serve as a dynamic damper and move vertically, induction current is generated in the coil 125 of the coil assembly 123 to realize power generation. As a result, the mount 100 also functions as a power generator.

Furthermore, when current is output from the coil 125 of the coil assembly 123 through a conductive wire 126 electrically connected to the coil 125 via the power generation operation described above, the electricity may be supplied to and stored in an in-vehicle battery 127 through the conductive wire 126 to realize battery charging, and the electricity stored in the battery may be used later in the vehicle.

Furthermore, as illustrated in FIG. 9, when the current of the battery 127 is applied to the coil 125 through the conductive wire 126, the magnet assembly 118 including the magnet 120 vibrates via interaction with the coil 125. At the instant time, vibration having a phase opposite that of the vibration transferred to the active engine mount 100 from the outside thereof occurs in the magnet assembly 118.

That is, the magnet 120 and the cores of the magnet assembly 118 (designated by reference numerals "119" and "121" in FIG. 7A, FIG. 7B and FIG. 7C) vertically move and perform the active mount function of controlling vibrations. At the instant time, the magnet 120 and the cores may exert the active amount function only with respect to low-frequency vibrations due to the weight of the magnet 120.

This is because the actuator assembly 110 has a large weight, and therefore, mainly enables control of low-frequency vibrations.

In the present way, the active engine mount 100 according to an exemplary embodiment of the present invention may perform not only a natural active mount function of controlling vibrations but also the functions of a mass damper and a power generator.

Figure 10A:
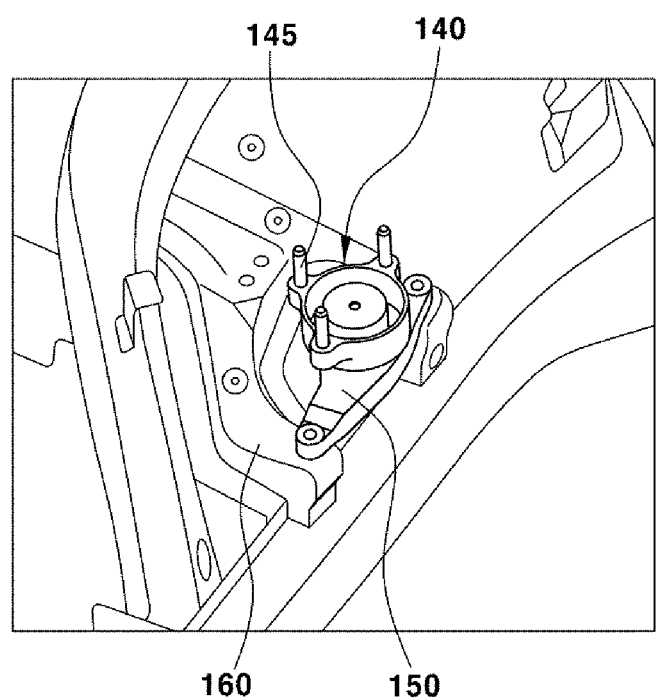
FIG. 10A, FIG. 10B, and FIG. 10C are schematic views illustrating a process of assembling the vehicle active engine mount according to the exemplary embodiment of the present invention between an engine and a vehicle body.
Figure 10B:
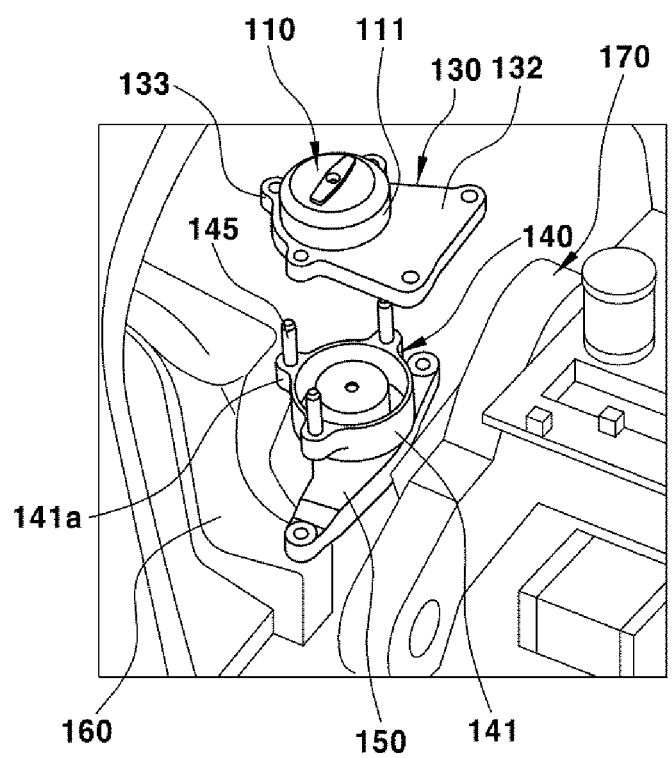
Figure 10C:
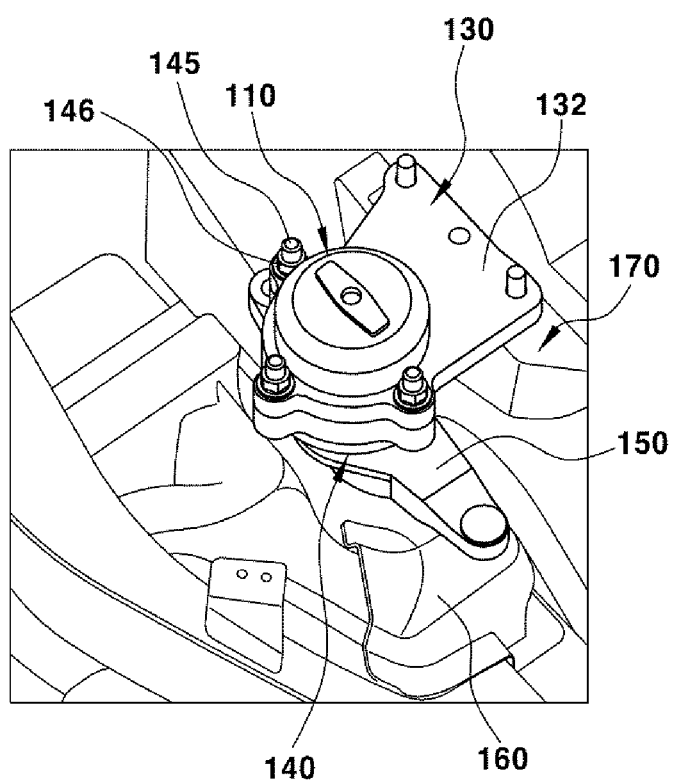

FIG. 10A, FIG. 10B, and FIG. 10C are views illustrating a process of mounting the engine mount 100 to the vehicle body 160 and connecting the engine mount 100 to the engine 170. In the state in which the mounting bracket 150 fastened to the core bolt 143 of the rubber assembly 140 is assembled with the vehicle body 160 (e.g., a side member), the actuator assembly 110 and the support bracket 130, which are integrally coupled to each other, are assembled with the rubber assembly 140.

Subsequently, when the engine mounting plate 132 of the support bracket 130 is bolted to the engine 170 and the support bracket 130 and the housing 141 of the rubber assembly 140 are fastened to each other using the bolts 145 and the nuts 146, the assembly of the active engine mount 100 in an exemplary embodiment of the present invention is completed.

In the present way, in the engine mount 100 according to an exemplary embodiment of the present invention, since the actuator assembly 110 is provided to be located in the upper portion of the engine mount 100, unlike a conventional engine mount (that is not of an inverse-type such that an actuator is provided in the lower portion of the engine mount), it is possible to eliminate a conventional package layout problem, such as interference due to the tires and the vehicle body under the mount, and to achieve freedom to set, for example, the size of the actuator assembly. Therefore, the engine mount 100 according to an exemplary embodiment of the present invention is advantageous in terms of package layout.

Furthermore, since the weight of the actuator assembly 110 is applied to the support bracket 130, the actuator assembly 110 may also serve as a mass damper, which may achieve improved NVH performance.

Furthermore, since the actuator assembly 110 having a certain weight is configured as a dynamic damper for a power-train bounce (about 10 Hz) mode, driving vibrations may be eliminated and omission of a fluid system is possible.

In particular, by adjusting the characteristics of the insulator member 114 which supports the weight of the magnet 120 and the cores 119 and 121 of the actuator assembly 110, the actuator assembly 110 may function as a dynamic damper in a power-train bounce mode, which enables omission of a fluid system.

FIG. 11 is a view illustrating the characteristics of the inverse-type active engine mount 100 according to the exemplary embodiment of the present invention, along with a conventional rubber mount and a conventional fluid mount for comparison.

In conclusion, since a fluid system is omitted in the inverse-type active engine mount 100 according to an exemplary embodiment of the present invention, conventional problems of a fluid system may be solved.

That is, the actuator assembly 110 is configured as a dynamic damper to overcome driving vibrations even if a fluid system is omitted. The removal of a complicated fluid system results in a reduction in price and robustness of a mount system may be achieved by replacing a fluid system with an actuator system.

Furthermore, poor manufacturing efficiency due to fluid sealing, for example, and the generation of rattle noise generated in a fluid system may be prevented.

In a conventional active engine mount, force may not be assuredly transferred to a main rubber since the force is transferred via a fluid system. However, in the active engine mount 100 according to an exemplary embodiment of the present invention, since such a fluid system is eliminated, force is transferred via contact between rubber elements, more particularly, contact between the rubber stopper 122 and the main rubber 144, which secures sufficient vibration attenuation without a fluid system.

Upon the assembly of the engine mount of the present invention, the stopper 122 of the actuator assembly 110 and the main rubber 144 of the rubber assembly 140 are assembled to come into contact with each other in the compressed state thereof, and the transfer of force is achieved in the compressed state of these elements. Accordingly, the actuator assembly 110 is configured as a dynamic damper, and as a result, the omission of a fluid system is possible.

Here, the balance of force may be achieved via the contact and compression of both the rubber elements, which may prevent unwanted separation of the actuator assembly after assembly.

Furthermore, in the active engine mount 100 of the present invention, since the actuator assembly 110 and the rubber assembly 140 are separately provided, tuning freedom may be enhanced, and optimum tuning characteristics may be obtained via free combination of the main rubber 144, the support bracket 130, and other elements.

Furthermore, the active engine mount 100 according to an exemplary embodiment of the present invention, as described above, is a power-generator-combined mount 100 having a natural active mount function of controlling vibrations, a mass damper function, and a power generator function.

Accordingly, a reduction in the capacity of an alternator provided in a vehicle is possible, which may result in a reduction in price and weight.

Furthermore, owing to an inverse-type structure in which the support bracket 130 is separable, tuning freedom may be increased, the support bracket 130 may be additionally replaced alone, and a reduction in vibration and noise as well as a reduction in vibration caused by downward sloping of the mount may be achieved.

As is apparent from the above description, according to an inverse-type active engine mount for a vehicle of the present invention, it is possible to omit a fluid system, to achieve a simplified configuration despite the provision of an actuator, and to eliminate disadvantages in terms of the size and the packaging thereof.

The disclosure has been described in detail with reference to exemplary embodiments thereof. However, it will be appreciated by those skilled in the art that the present invention may be implemented in various modifications and alterations via, for example, addition, change or omission of constituent elements without departing from the principles and spirit of the disclosure, and these modifications and alterations are included in the scope of the present invention.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An active engine mount for a vehicle, the active engine mount comprising:
    a support bracket connected to an engine;
    an actuator assembly integrally coupled to the support bracket and including a magnet and a coil that electromagnetically interact with each other; and
    a rubber assembly including a housing and a main rubber and mounted to a vehicle body by a mounting bracket and configured to absorb vibration via the main rubber,
    wherein, in a state in which the actuator assembly is located above the rubber assembly, the housing of the rubber assembly is fastened to the support bracket, and
    wherein the magnet is mounted to be movable with respect to the housing and connected to the main rubber of the rubber assembly for transfer of force so that when the magnet of the magnet assembly repeatedly moves vertically, electricity is generated via interaction between the magnet and the coil according to a repeated movement of the magnet.

2. The mount of claim 1, wherein the actuator assembly includes:
    a hook cup inserted into and coupled to a mounting hole formed in the support bracket;
    a coil assembly fixedly provided inside the hook cup and including the coil;
    a magnet assembly of the actuator assembly, the magnet assembly including the magnet; and a magnet-fixing insulator configured to vertically movably support the magnet assembly in the hook cup.

3. The mount of claim 2, wherein the hook cup is formed on a lower end portion thereof with a plurality of support columns, and each support column is formed on an external surface thereof with an external hook which protrudes outwards to be inserted into and caught by a locking groove formed in the mounting hole in the support bracket so that the hook cup is fastened to the support bracket by the external hook.

4. The mount of claim 3, wherein each support column is formed on an internal surface thereof with an internal hook which protrudes inwards to couple the coil assembly and fix the coil assembly to the hook cup.

5. The mount of claim 4, wherein the support columns formed on the lower end portion of the hook cup are spaced from each other with a predetermined distance in a circumferential direction of the hook cup, and the external hook and the internal hook are formed respectively on the external surface and the internal surface of a lower end portion of each support column.

6. The mount of claim 3, wherein the locking groove is formed in a lower end portion of an internal-diameter portion of the mounting hole, and the external hook is formed on the external surface of a lower end portion of each support column.

7. The mount of claim 3, wherein the mounting hole is formed to have a draft angle from a top side to a bottom side of the mounting hole.

8. The mount of claim 2, wherein the magnet-fixing insulator includes:
a ring core fixed inside the hook cup;
an insulator member fixed inside the ring core;
a support core inserted into a center of the insulator member and fixed thereto; and
a bolt having an end portion coupled to the support core,
wherein the magnet assembly is positioned under the insulator member, and
wherein the magnet-fixing insulator and the magnet assembly are fixed to each other by the bolt and a nut as the nut is fastened to a remaining end portion of the bolt in a state in which the bolt penetrates the magnet assembly.

9. The mount of claim 2, wherein the magnet assembly includes:
an upper core positioned under the magnet-fixing insulator;
the magnet positioned under the upper core;
a lower core positioned under the magnet; and
a stopper fixed to the lower core and configured to contact with the main rubber of the rubber assembly for transfer of the force.

10. The mount of claim 9, wherein the magnet-fixing insulator includes a bolt disposed to extend downwards inside the hook cup, and
wherein, in a state in which the bolt penetrates the upper core, the magnet, and the lower core, a nut is fastened to an end portion of the bolt so that the magnet-fixing insulator and the magnet assembly are fixed to each other by the bolt and the nut.

11. The mount of claim 9,
wherein the upper core takes a form of an open-bottomed circular container including an upper surface portion and a side surface portion,
wherein the magnet and the lower core are located inside the side surface portion of the upper core, and
wherein the coil assembly is disposed around an external periphery of the magnet.

12. The mount of claim 11, wherein the coil assembly includes:
a support frame having an annular shape; and
the coil provided in the support frame to be disposed in a circumferential direction of the support frame.

13. The mount of claim 12, wherein the support frame includes:
a lower surface portion having an annular shape;
an external wall protruding upwards from an outer-diameter portion of the lower surface portion and contacting with an internal surface of the hook cup; and
an internal wall protruding upwards from an internal-diameter portion of the lower surface portion and disposed parallel to the external wall, and
wherein the coil is provided in the circumferential direction of the support frame in a space between the internal wall and the external wall of the support frame.

14. The mount of claim 13, wherein the side surface portion of the upper core is positioned between the internal wall and the external wall of the support frame.

15. The mount of claim 14, wherein the internal wall of the support frame, the coil of the coil assembly, the side surface portion of the upper core, and the external wall of the support frame are positioned in series in a radial direction of the support frame.

16. An active engine mount for a vehicle, the active engine mount comprising:
a support bracket connected to an engine;
an actuator assembly integrally coupled to the support bracket and including a magnet and a coil that electromagnetically interact with each other; and
a rubber assembly including a housing and a main rubber and mounted to a vehicle body by a mounting bracket and configured to absorb vibration via the main rubber,
wherein, in a state in which the actuator assembly is located above the rubber assembly, the housing of the rubber assembly is fastened to the support bracket,
wherein the actuator assembly further includes a stopper fixed to a lower core and configured to contact with the main rubber of the rubber assembly for transfer of a force, and
wherein the magnet is mounted to be movable with respect to the housing and connected to the main rubber of the rubber assembly in a state where the stopper is in contact with the main rubber for transfer of the force so that when the magnet of the magnet assembly repeatedly moves vertically, electricity is generated via interaction between the magnet and the coil according to a repeated movement of the magnet.

* * * * *